Sept. 22, 1964     H. KOSSMANN     3,149,904
INK SUPPLY MEANS FOR RECORDING DEVICES
Filed March 18, 1963     2 Sheets-Sheet 1

INVENTOR.
Hans Kossmann
BY Horton, Davis, Brewer & Brugman
Attys.

Sept. 22, 1964  H. KOSSMANN  3,149,904
INK SUPPLY MEANS FOR RECORDING DEVICES
Filed March 18, 1963  2 Sheets-Sheet 2
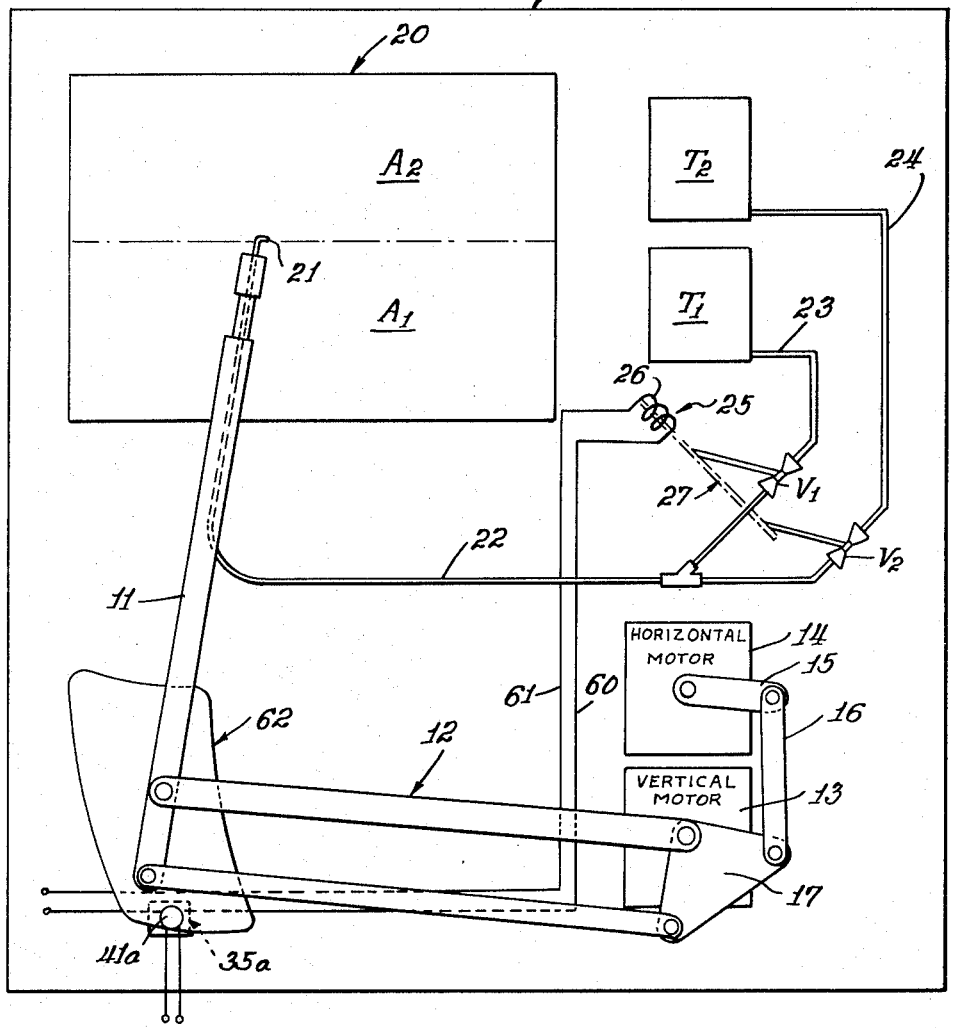
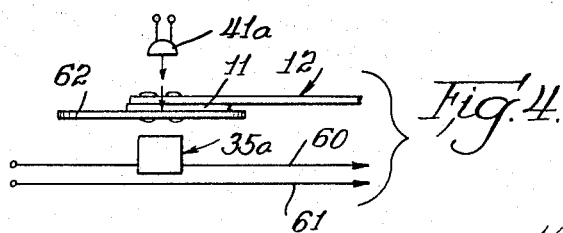
INVENTOR.
Hans Kossmann

United States Patent Office 3,149,904
Patented Sept. 22, 1964

3,149,904
INK SUPPLY MEANS FOR RECORDING DEVICES
Hans Kossmann, Palatine, Ill., assignor to Victor Comptometer Corporation, Chicago, Ill., a corporation of Illinois
Filed Mar. 18, 1963, Ser. No. 265,974
11 Claims. (Cl. 346—140)

This invention relates generally to improved recording means for graphic recording apparatus and, more particularly, to improved means for supplying ink to recording pen means in graphic communication systems in which the recording pen is moved omnidirectionally over a substantially vertically disposed recording medium or area.

The improved recording and ink supply means of this invention, in addition to general application, is particularly useful in graphic recording devices such as the type generally described in U.S. Patent No. 2,583,535, issued January 29, 1952, but with special adaptation of such recording devices to operating positions wherein the pen moves over and records on a generally vertically disposed recording medium or area and is usually subjected to rapid acceleration forces. Recorders of this general class having vertical writing or recording areas are known in the art and in some the problem of supplying ink to the movable pen or scribing device has been met by utilizing a closed pressurized ink supply reservoir system in which ink is supplied to the recording pen under positive pressures. Other recording devices, particularly of the type having substantially horizontal recording areas, employ a combined capillary ink supply and gravity reservoir system. However, neither the closed tank, positive pressure inking system or the capillary-gravity supply system are completely satisfactory for use in recorders wherein the scribing pen must write or mark over a relatively large vertical area with rapid movements. For example, the closed pressure systems are prone to operational change with environmental conditions due to such factors as variations in temperature; a minute temperature rise causing expansion of air and ink in the reservoir to create an undesirable oversupply and bleeding of ink from the pen nib. This is particularly undesirable when the pen is at an at-rest condition between transmissions. The more familiar capillary feed and gravity reservoir systems, while generally satisfactory where the recording surface is substantially horizontal or of limited vertical dimension, are definitely limited by an inherent inability of the capillary feed system to supply ink satisfactorily beyond limited elevations of the writing nib above the level of ink in the reservoir. For fast writing, accompanied by positive, clear ink marking without skipping, capillary rise at sea level in such systems is typically found to be limited to less than 1" of elevation above reservoir ink level.

According to the present invention, many of the undesirable characteristics and difficulties encountered with previous ink supply systems for vertical recorders, as mentioned heretofore, have been alleviated by utilizing a unique combination of capillary inking feed system and open pressure ink reservoir means. While, as pointed out heretofore, such a combined system is normally satisfactory for horizontal recording purposes, the same has generally been conceded to have very limited practical application in vertical recording because of the inherent limitations of the capillary feed system. That is to say, in such a capillary and gravity feed system, the normal vertical movement or elevation of the pen without loss of satisfactory ink supply above the liquid or ink level within the reservoir is generally so limited as to be impractical for covering writing areas of any substantial vertical dimension. If this limitation is alleviated by raising the reservoir to increase gravity head of the liquid, undesirable flooding or bleeding at the pen nib will occur, especially at elevations of the pen below the reservoir liquid level. It is thus well recognized that a fine balance between gravity head and capillary action of the inking pen and feed system must be maintained to achieve a satisfactory working result when using the gravity-capillary scheme. If the area to be confronted by the writing pen is limited in vertical dimension to the capillary capability of the pen feed system, such a gravity ink supply and capillary feed system may be operationally acceptable even in a vertical recorder. However, in those instances where a considerable vertical dimension is desired in the recording area, heretofore known capillary pen feed and atmospheric pressure reservoir systems have proven incapable of meeting recognized requirements and standards for acceptable recorder operation.

The present invention, while resorting to the capillary and open tank or gravity reservoir supply systems, as above mentioned, nevertheless achieves the desired result of maintaining a proper ink supply to a pen movable throughout a substantial vertical dimension of a vertically disposed recording area. That is to say, a vertical dimension which substantially exceeds the normally recognized and expected limitations of such capillary systems, as above discussed, may be achieved by the present invention. This desirable result is brought about by combining two or more open gravity tank reservoirs with a capillary ink supply system feeding a single writing pen; the tanks being mounted one above the other so as to effect a tandem gravity ink supply or tank system, each of which tank is joined to a common capillary feed supply tube or conduit associated with the writing nib of the pen. Means are provided for selectively coupling each tank, individually, to such common capillary feed conduit by selective operation of suitable valve means actuatable in response to selected positioning of the pen or writing nib within separate designated zones of the recording area. Preferably, valve actuating means, such as electrical solenoid means or some other equivalent system, is coupled to the valve means to automatically operate the latter upon selective energization of the control circuit; such energization taking place by selected pen positioning or movement between predetermined zones of the recording area. Provision is made so that only one ink reservoir is coupled at any one time to the pen's capillary feed means, while always maintaining the capillary feed supplied with ink from one of the reservoirs. Thus, the capillary feed is constantly filled with ink and any evaporation at the writing nib only serves to supply additional ink thereto. Each reservoir and the associated capillary feed system is designed to adequately supply ink to the writing nib of the pen throughout one of the designated zones of the recording area without flooding or skipping.

In a typical installation, according to the present invention as illustrated in the accompanying drawings, two tandem related reservoir tanks are individually coupled to a common capillary pen feed system by means of two alternately opened and closed solenoid operated shut-off valve means while a photocell control circuit means, responsive to pen movement between designated zones of the recording area, functions to control valve operation.

The main object of this invention is to provide a new and improved ink supply means for use in graphic recording apparatus wherein the recording medium or area confronted by an inking pen is vertically disposed.

Still another object of this invention is to provide a new and improved ink supply system, as above mentioned, in which two or more gravity ink supply tanks are selectively coupled one at a time to a capillary ink supply conduit means associated with the recording pen.

A further and important object of this invention is to provide an improved ink supply system, as set out in the preceding object, in which one of the gravity supply tanks is always coupled to the capillary conduit system by selectively operable valve means actuatable in response to preselected movements of the recording pin.

Still another object of this invention is to provide a new and improved ink supply system for vertical graphic recording means in which simple gravity supply tank and capillary feed means are combined and arranged in a manner to constantly supply ink to a writing stylus or inking pen from alternate tanks depending on the vertical positioning of the pen within selected zones of a writing area.

A still further and important object of this invention is to provide an improved ink supply system for vertical graphic recording apparatus in which the recording area is disposed in a substantially vertical plane and confronted by an omnidirectionally movable writing pen and wherein the movement of the pen between predetermined adjacent zones or areas of the recording area serves to initiate automatic operation of valve means for changing or coupling alternate supply tanks to a capillary pen ink supply and feed system.

The above and further objects, features and advantages of this invention will be recognized by those familiar with the art from the following detailed description of preferred and modified embodiments of its features as illustrated in the accompanying drawings.

In the drawings:

FIGURE 3 is another schematic view, similar to FIGURE 1, illustrating another form of the present invention utilizing a modified valve initiating means; and FIGURE 4 is a schematic view showing portions of the device set forth in FIGURE 3 in elevation to further illustrate the modified valve initiating means thereof.

Figure 1:
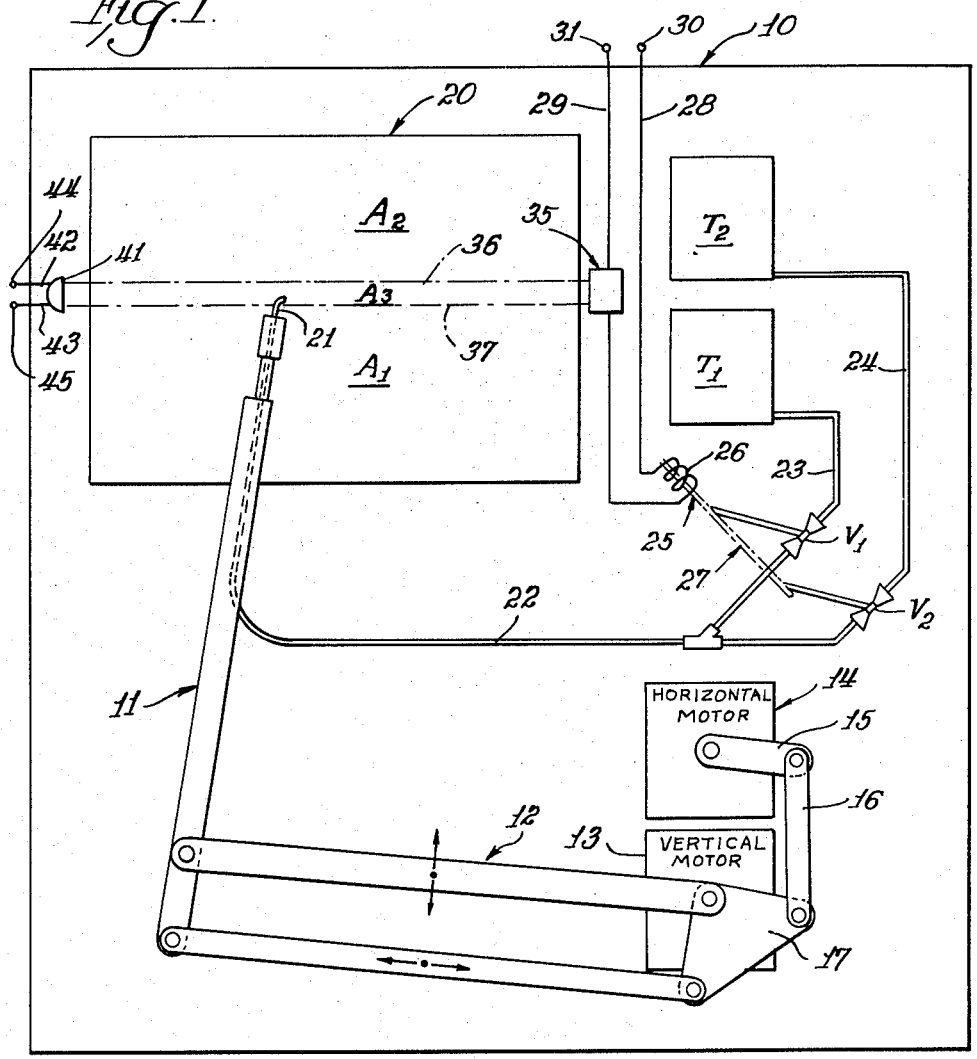
FIGURE 1 is a schematic plan view of a typical graphic recorder device embodying the improved ink supply means of this invention.
Figure 2:
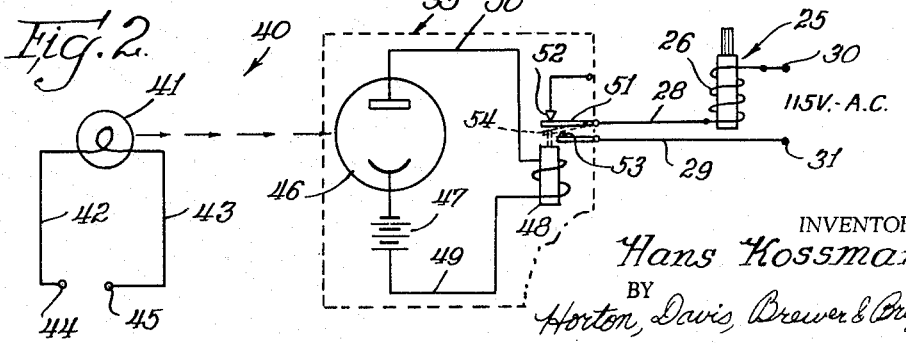
FIGURE 2 is a schematic wiring diagram of the electrical valve initiating and control means employed in the device illustrated in FIGURE 1.

Turning now to the features of the embodiment of the present invention illustrated in FIGURES 1 and 2 of the drawings, it will be appreciated that a graphic recording device, schematically shown and indicated generally by numeral 10 in FIGURE 1, includes a movable recording pen or stylus means 11 which is pivotally supported at one end by a pantograph linkage system, indicated generally by numeral 12. The pantograph linkage is driven by vertical drive motor means 13 and horizontal drive motor means 14, associated therewith by a drive link means, such as links 15, 16 and bell crank means 17. Thus the pantograph linkage system 12 is adapted to move the pen means omnidirectionally over a writing or recording area 20 of the graphic recording device 10 according to the coordinate driving movements of motors 13 and 14 which are controlled by signals generated at remote transmitter means. Typically, writing area 20 is confronted with an underdisposed, periodically movable recording medium, such as an elongated web of paper, movable over a planar writing support between a pair of rollers so as to selectively present a clear area of recording medium for successive transmissions of graphic intelligence to be recorded by the pen means thereon. This is all according to recognized practice in the art. Also, as is well known in the art, the drive motors 13 and 14 move the recording pen means 11 according to graphic data signals which in certain systems are representative of vertical and horizontal coordinates corresponding to coordinate movements of a similar stylus at remotely positioned transmitters or transmitter-receiver devices in a graphic communication system.

The pen means 11 supports and carries at its outer end a suitable capillary writing nib 21 which is associated with a capillary ink feed conduit system comprising a flexible capillary tube 22 fastened to the nib 21 and to a pair of branch capillary conduits 23 and 24, respectively coupled to conduit 22 by a common connector and to supply tanks or ink reservoir means T1 and T2. Shut-off valve means V1 and V2 are associated with each of the capillary branch conduits 23 and 24, respectively, for selectively shutting off each of said branch conduits and thereby selectively connecting the common capillary feed conduit 22 with one or the other of the supply tanks or reservoirs T1 and T2 under selected operational circumstances.

Means for actuating shut-off valve means V1 and V2 comprises solenoid actuator means 25 having an operating coil 26, as shown in FIGURE 2. Mechanical linkage means, designated generally 27 in FIGURE 1, are also associated with the solenoid actuator 25 and the valve means V1 and V2 so as to simultaneously open one of the valve means and close the other valve means upon energization of the solenoid means and vice versa upon deenergization thereof. Thus, for example, when valve V1 is open, valve V2 is shut and when valve V2 is open, valve V1 is shut.

Typically, the solenoid means 25 is controlled by a circuit supplied with electrical energy from a suitable A.C. supply source, such as 115 volts A.C., over supply conductors 28 and 29, respectively coupled to supply terminals 30 and 31 connected to the energy supply.

Selective energization of the supply circuit for the solenoid means 25 is controlled by initiating switch means, indicated generally at 35 in FIGURE 1, and in circuit with conductor 29. The switch means 35 is actuated in response to movement of the pen means 11 between preselected zones A1 and A2 of the recording area 20. In this latter respect, as illustrated in FIGURE 1, the two zones or areas A1 and A2 slightly overlap, substantially midway or centrally of the vertical dimension of recording area 20, as indicated by the area designated A3, bounded vertically by dotted lines 36 and 37 in FIGURE 1.

With particular regard to the recording area 20, the same is usually rectangular and located in a substantially vertical plane or, for purposes of this invention, in a plane having a slope exceeding approximately 30° from the horizontal. In the present description, however, the plane of the recording area 20 may be considered as vertical. Therefore, the dotted lines 36 and 37 indicating the overlapping areas of the preselected zones A1 and A2 of the recording area are horizontally oriented, as illustrated.

Means for initiating actuation of the switch means 35 in response to the vertical movement of pen means 11 and, more particularly, movement of the pen means across the boundaries of and between designated zones A1 and A2 of recording area 20, preferably comprises photocell circuit means or its equivalent. The photocell circuit means is indicated generally by numeral 40 in FIGURE 2 of the drawings and, as therein shown, includes a light source 41, such as an incandescent light bulb supplied by a low voltage A.C. source, typically six volts A.C., over supply conductors 42, 43 connected to supply terminals 44 and 45, respectively. The light bulb 41 is located, according to the embodiment set out in FIGURE 1, substantially midway of the vertical dimension for the recording area 20 and to one lateral side thereof so as to supply a light beam crossing the overlapping zone of areas A1 and A2 and traversing the lateral dimension of the recording area 20. The light beam impinges a photocell 46 which is supplied from a D.C. source 47, typically 40 volts D.C., and is in series circuit with a relay 48 by means of conductors 49 and 50. The relay 48 includes movable contact means 51 and stationary contacts 52 and 53 disposed on opposite sides of contact 51. In operation, relay 48 actuates the movable contact 51 into engagement with stationary contact 53 when energized, and conversely, releases movable contact 51 so that the same engages a stationary contact 52 when the relay is deenergized. This in turn serves to correspondingly energize and deenergize the valve operating solenoid means 25 to thereby close the normally open valve means V1 and open the normally closed valve means V2 and vice versa. Thus, for example, with relay 48 energized so that the movable contact 51 is in engagement with the stationary contact 53 as indicated by the dotted line position therefor, indicated by numeral 54 in FIGURE 2, solenoid coil 26 is energized over its then completed supply circuit to throw the solenoid actuator means 25 to its energized position. This in turn serves, via linkage means 27, to open one of the valve means V1 or V2 and close the other. For present purposes, it may be considered that valve V1 is opened upon energization of the solenoid means 25 and valve V2 is closed. Such a condition would normally occur and persist when the photocell 46 is energized, or, that is, when the light beam from the light source 41 is uninterrupted. However, when the pen means 11 moves through zone A3 of the recording area 20 and into area A2, the pen means causes interruption of the light beam. This deenergizes the photocell 46 and thus deenergizes the relay 48. Under such circumstances, the movable relay contact 51 will engage stationary contact 52 to deenergize solenoid 25 and cause valve V1 to be closed and valve V2 to be opened.

It will thus be recognized from the foregoing description that the selective opening and closing of the control valve means V1 and V2 serve to respectively couple the reservoir means T1 and T2 selectively to the capillary ink supply or feed conduit means 22, associated with the pen nib 21. This takes place rapidly and is directly responsive to the positioning movement of the pen means within designated zones of the recording area 20. Therefore, so long as the pen means 21 remains in area A1, valve means V1 will remain open so that ink from reservoir T1 will be supplied to the pen nib 21 via the capillary conduit 22 and the branch capillary conduit 23. However, when the pen means 11 traverses the light beam of the photocell circuit to deenergize the photocell, as when the same moves into the overlapping zone A3 between areas A1 and A2, deenergization of the valve operating solenoid means 25 occurs to shut valve V1 and open valve V2. In this latter operational condition, ink is supplied to the pen nib 21 from supply reservoir T2 over branch capillary conduit 24 and the capillary feed conduit 22.

As explained previously, each of the reservoir means T1 or T2 is an open or atmospheric tank for containing a supply of recording ink and, as shown in FIGURE 1 of the drawings, tank T2 is disposed vertically over or at a higher elevation than tank T1. Each of the reservoirs or tanks which supplies the gravity feed head cooperates with its associated capillary feed conduit system and, particularly, the length and capillary passageway therein to properly supply ink to the pen nib 21 while the same is in a related one of the designated zones A1 or A2 of the recording area.

In the particular embodiment illustrated in FIGURE 1, tank T1 is shown as supplying ink to the pen nib while the latter is in area A1 and, similarly, tank T2 supplies ink to the pen nib while the latter is in area A2. The automatic shifting of the control valve means V1 and V2 occurs whenever the pen traverses or interrupts the light beam supplied to the photocell from the light source 41. Thus, when the pen means moves from area A1 into area A2, the light beam is interrupted, as above explained, to shift the ink supply from reservoir tank T1 to tank T2. Conversely, when the pen moves from area A2 into area A1, the interruption of the light beam from light source 41 is terminated, restoring the energizing circuit to the relay 48 of the photocell circuit to cause a corresponding energization of the valve operating solenoid means 25, shutting valve V2 and opening valve V1 to thereby shift ink supply from reservoir T2 to reservoir T1.

Turning now to the second embodiment of the present invention set forth in FIGURES 3 and 4 of the drawings, it will be understood that the graphic recording device 10, the normal pen actuating means 12, ink supply reservoir means T1 and T2, capillary conduit feed means 22, control valve means V1 and V2 and other elemental portions of the present invention, are substantially the same as above described and illustrated in FIGURE 1 of the drawings and such are correspondingly numbered in FIGURE 3. The major exception from this sameness is the arrangement of the photocell circuit means for controlling operation of the solenoid means 25 in response to pen movement between areas A1 and A2 of the recording area 20. That is to say, in the embodiment of the present invention illustrated in FIGURES 3 and 4, the previously described photocell circuit 40 wherein the light beam from source 41 traversed the recording area 20 has been modified and replaced with an alternate arrangement which will now be described in detail.

As will be seen from FIGURE 3 in particular, the solenoid means 25 is coupled to a supply source via conductors 60 and 61 and to a control switch means 35a (corresponding to switch means 35 of FIGURE 2). In this modified form of the present invention, however, the light source 41a which serves to energize the photocell of the control switch means 35a is disposed over the pantograph linkage system 12 associated with the pen means 11, while the switch means 35a is disposed therebeneath (FIGURE 4). A light shield 62 is then mounted on the pantograph linkage system so as to move between the overdisposed light source 41a and the underlying photocell of switch means 35a. The configuration of the shield 62, which generally comprises a planar element, is further such that it occludes or interrupts the light beam from source 41a for all movements of the pen nib 21 throughout or over one of the zones of the recording area 20, such as the lower zone A1. When the pen nib 21, however, is moved into zone A2 of the recording area, the shield 62 is moved so as to re-establish the transmission of light from source 41a to the photocell of the switch means 35a disposed therebeneath. This condition will obtain throughout all movements of the pen nib 21 within zone A2.

Thus, it will be understood that alternate opening and closing of the valve means V1 and V2 serves to alternately couple reservoirs T1 and T2 to the capillary feed conduit 22 associated with the pen nib 21 substantially as previously described in association with the embodiment of this invention set out in FIGURE 1, except for the operational arrangement of the photocell circuit and its operational relation to the valves V1 and V2. In this latter respect, so long as shield 62 is interposed between the light source 41a and the photocell of the switch means 35a, the latter will be deenergized and the normally open valve V1 will remain open to supply pen nib 21 with ink from the gravity reservoir T1. It will be recalled that in the FIGURE 1 embodiment, the photocell is energized in this condition of operation. Likewise, when the pen nib 21 is moved into the upper zone A2 of the recording area, solenoid 25 will be energized by impingement of the light source on the photocell of switch 35a to thereby energize the latter to close valve V1 and open the normally closed valve V2. This latter operational condition, of course, serves to couple the pen nib to the ink reservoir T2.

From the foregoing, it is believed that those familiar with the art will readily recognize and appreciate the unique features and advancement of the present invention over previously known devices of this character. Further, it will be understood that while the present invention has been described in association with particular and preferred embodiments thereof as set forth in the accompanying drawings and above described, the same nevertheless is susceptible to change, variation and substitution of equivalents without departure from the spirit and scope of this invention. It is therefore intended that the present invention be unrestricted by the foregoing description and illustrations, except as may appear in the following appended claims.

I claim:

1. In graphic recording apparatus having recording pen means movable omnidirectionally over a substantially vertical recording area, improved means for supplying ink to the pen means comprising, plural gravity ink reservoir means, plural conduit means coupling each of said reservoir means individually to the recording pen means, plural valve means associated one with each of said conduit means for selectively controlling the flow of ink from each of said reservoir means to the pen means, actuator means operatively associated with said valve means for selectively controlling the flow of ink therethrough to a manner to simultaneously open one valve means at a time and close the remaining valve means, and means for initiating operation of said actuator means to couple one of said reservoir means at a time with the pen means in response to the positioning of the pen means within each of a plurality of preselected zones of the recording area whereby ink is supplied to the pen means from only one of said reservoir means whenever the pen means is positioned in each of said zones.

2. In graphic recording apparatus having recording pen means movable omnidirectionally over a recording area disposed in a generally vertical plane, improved means for supplying ink to the pen means comprising, a pair of gravity tank ink reservoir means, conduit means coupling each of said reservior means to the recording pen means, a pair of valve means, one associated with each of said conduit means for selectively controlling the flow of ink therethrough and thus selectively controlling the flow of ink from each reservoir means to the pen means, valve actuator means selectively operable for controlling actuation of said valve means and arranged therewith to simultaneously open one of said valve means and close the remaining valve means and vice versa, and means for initiating operation of said valve actuator means to selectively couple one of said reservoir means at a time with the pen means in response to the positioning of the pen means within each of a plurality of preselected zones of the recording area so that ink is supplied to the pen means from a different one of said reservoir means whenever the same is positioned in each of said preselected zones.

3. In graphic recording apparatus having recording pen means movable omnidirectionally over a substantially vertically disposed recording area, improved means for supplying ink to the pen means comprising, at least two gravity ink reservoir means, conduit means individually coupling each reservoir means to the recording pen means, valve means mounted in each of said conduit means for selectively controlling operation thereof and arranged in thereby individually control the supply of ink from each of said reservoir means to the pen means, electrical circuit means including electrically operable valve actuator means operatively associated with said valve means in a manner to simultaneously open one of said valve means and close the remaining thereof and vice versa, and switch means in said circuit means for initiating operation of said actuator means in response to predetermined positioning of the pen means in each of a plurality of preselected zones of the recording area whereby each of said reservoir means and its associated conduit means is conditioned to supply ink to the pen means whenever the latter is within one of said preselected zones.

4. The combination as set forth in claim 3 wherein said switch means comprises photocell circuit means and an initiating light source therefor, the said light source being disposed along one lateral margin of the recording area with the photocell means opposite thereto so that the light beam emitted from said light source traverses the recording area substantially at the boundary between adjacent zones thereof whereby movement of the pen means from one zone into an adjacent zone serves to operate said photocell circuit means to effect operation of said valve actuator means and valve means to thereby correspondingly shift the ink supply for the pen means from one reservoir means to the other.

5. The combination as set forth in claim 3 wherein one of said valve means is normally open and the remaining valve means is normally closed and said electrical actuator means and said switch means are arranged therewith so that said valve actuator means is energized whenever the record pen means is in one zone of the recording area and is deenergized whenever the pen means is in a second zone of the recording area.

6. The combination as set forth in claim 3 wherein said switch means includes photocell circuit means having photocell means and a light source for operating the same, the photocell means and light source therefor being positioned remotely of the recording area, and shield means carried by the pen means in a manner to occlude the light source from the photocell means for all movements of the pen means throughout one of said preselected zones of the recording area while permitting the said source to impinge said photocell means and energize the photocell circuit means for all movements of the pen means within and throughout a different zone of the recording area.

7. In graphic recording apparatus having a substantially vertically disposed recording area, the combination comprising, recording ink pen means mounted for omnidirectional movement over the recording area to record graphic data thereon, a pair of atmospheric gravity tank ink reservoir means, capillary conduit means coupling each of said reservoir means individually to said pen means, each reservoir means and its associated capillary conduit means being arranged to supply ink to the pen means throughout movements of the latter over one of two preselected zones of the recording area, valve means mounted in said capillary conduit means for selectively isolating each of said reservoir means from said pen means, valve actuator means operatively associated with said valve means in a manner to simultaneously couple one of said reservoir means with said conduit means and pen means while isolating the other said reservoir means therefrom and vice versa, and means for initiating operation of said valve actuator means in response to movement of the pen means from one of said preselected zones into the other and vice versa.

8. The combination as set forth in claim 7 wherein said valve actuator means comprises electrical solenoid means and said means for initiating said valve actuator means comprises electrical circuit means having switch means in circuit with said solenoid means; said switch means being arranged for operation in response to movement of the said pen means across the boundary between the said preselected zones of the recording area.

9. The combination as set forth in claim 8 in which said switch means includes photocell circuit means having photocell means and an initiating light source therefor, the said photocell means being mounted adjacent one lateral margin of the recording area and the initiating light source therefor adjacent the opposite lateral margin of the recording area so that the beam of light emitted from said light source traverses the recording area substantially midway along the vertical dimension of the latter and at the boundary between the said adjacent preselected zones thereof whereby movement of the pen means across said boundary in one vertical direction serves to deenergize said photocell means by occluding said light source therefrom while such movement thereof in the opposite vertical direction serves to permit the light source to impinge said photocell means thereby to energize the latter.

10. The combination as set forth in claim 9 wherein said valve means is arranged to communicate or couple only one of said reservoir means with said pen means whenever said photocell means is energized and to couple the other said reservoir means with the pen means whenever the photocell means is deenergized.

11. The combination set forth in claim 7 wherein said means for initiating operation of said valve actuator means comprises an electrical solenoid means operatively associated with said valve means, electrical circuit means for operating said solenoid means, and photocell means for controlling energization and deenergization of said circuit means in response to the positioning of said pen means over preselected zones of the recording area.

No references cited.

UNITED STATES PATENT OFFICE
CERTIFICATE OF CORRECTION

Patent No. 3,149,904                                  September 22, 1964

Hans Kossmann

It is hereby certified that error appears in the above numbered patent requiring correction and that the said Letters Patent should read as corrected below.

Column 7, line 30, strike out "the flow of ink therethrough to" and insert instead -- operation thereof and arranged in --; line 69, strike out "operation thereof and arranged in" and insert instead -- the flow of ink therethrough to --.

Signed and sealed this 2nd day of February 1965.

(SEAL)
Attest:

ERNEST W. SWIDER                               EDWARD J. BRENNER
Attesting Officer                                  Commissioner of Patents